UNITED STATES PATENT OFFICE.

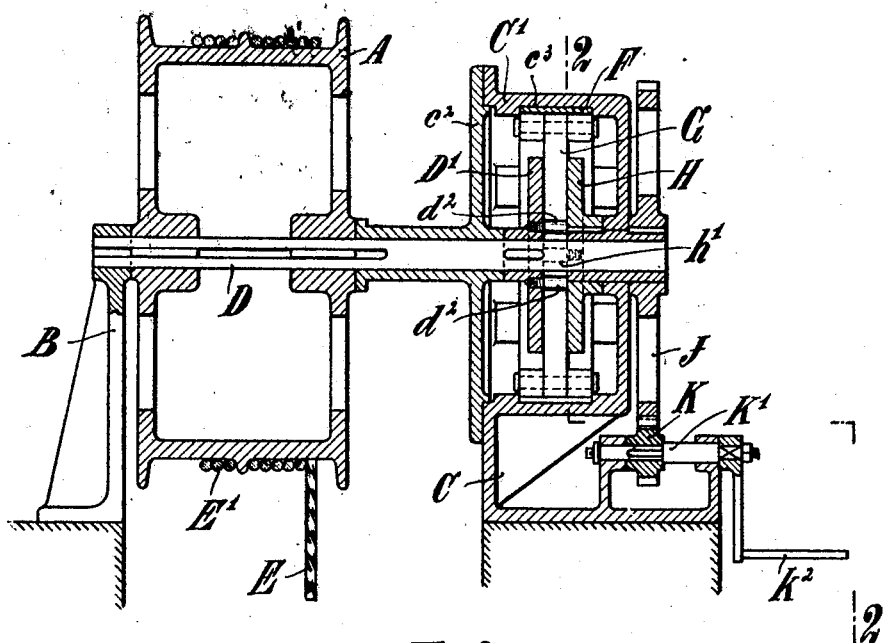
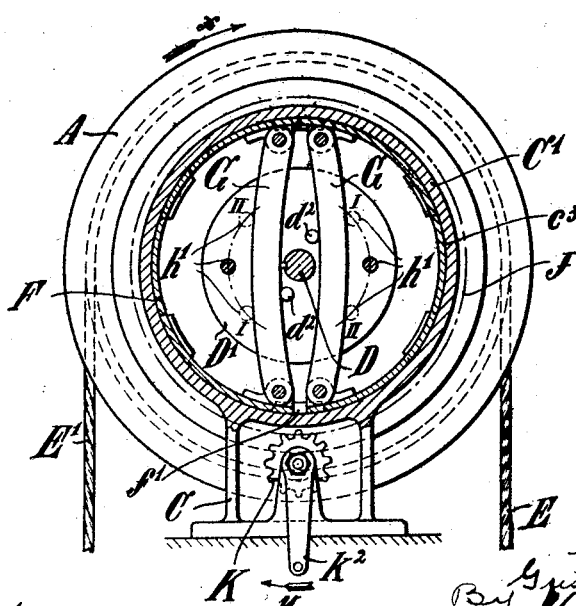

GUSTAV KLEBER, OF ESSEN-ON-THE-RUHR, GERMANY, ASSIGNOR TO FRIED. KRUPP AKTIENGESELLSCHAFT, OF ESSEN-ON-THE-RUHR, GERMANY.

AUTOMATIC BRAKE FOR HOISTING DEVICES.

1,408,209.   Specification of Letters Patent.   Patented Feb. 28, 1922.

Application filed February 3, 1915. Serial No. 5,924.

*To all whom it may concern:*

Be it known that I, GUSTAV KLEBER, residing at Essen-on-the-Ruhr West, Germany, a citizen of the German Empire, have invented a certain new and useful Improvement in Automatic Brakes for Hoisting Devices, of which the following is a specification.

The present invention relates to a load sustained automatic brake for hoisting devices which is of very simple construction, and which remains operative even with the change in the direction of the moment of load.

One embodiment of the present invention is illustrated in the accompanying drawing, wherein—

Figure 1 is a vertical, longitudinal section through a hoisting device, provided with a load sustained brake and—

Figure 2 a section along line 2—2 of Figure 1, seen from the right.

The winch comprises a drum A, rigidly secured on a shaft D, which is carried in two bearing stands B and C. On the drum A are provided two load ropes E and $E^1$, each with a cage for instance, the ropes being so arranged that one becomes unwound when the other is wound up. The bearing stand C is constructed, at its upper part, as a substantially cylindrical brake housing $C^1$ which is closed by a lid $c^2$. Against the cylindrical inner wall $c^3$ of the housing $C^1$, a slitted flexible brake band F impinges with a certain initial tension. The two ends of the brake band F are connected by means of two rods G, one on each side of the shaft D, with the portion of the brake band situated diametrically opposite the slit $f^1$. On the shaft D and inside the brake housing $C^1$ on each side of the rods G are provided, respectively, relatively rotatable disks $D^1$ and H. The disk $D^1$ is rigidly secured on the shaft D and carries two oppositely situated studs $d^2$, which grip between the two rods G. The other disk H is loosely mounted on the shaft D and carries two oppositely situated studs $h^1$, which are adapted to impinge against the outer sides of the rods G, see Figure 2. This disk H is moreover rigidly connected with a spur gear J, which is also loosely mounted on the shaft D. This spur gear is in mesh with a pinion K, which is carried by the driving shaft $K^1$ of the hoisting device, this shaft being provided with a hand lever $k^2$ and mounted in bearings in the stand C.

From the foregoing, it will be seen that the disks $D^1$ and H constitute two coaxially mounted coupled parts rotatable independently of each other within certain limits; that one of these coupled parts is in continuous positive connection with the member upon which the load acts, while the other is similarly connected with the driving member of the lifting mechanism; that the brake band F, which carries the rods G, constitutes a third body rotatable about the same axis as the coupled parts $D^1$ H, and the studs $d^2$ constitute striking pieces within the rods G, while the studs $h^1$ constitute striking pieces outside said rods, so that if the disk or coupled member $D^1$ should be rotated by the load in the direction to spread the rods G, the brake will be automatically applied, but so long as the striking pieces $h^1$ are rotated by the driving mechanism of the lift against the rods, said rods are forced toward each other and the braking pressure is released.

In describing the operation of the brake device, it will first be supposed that the load acts on rope E, so that the drum A, under the action of the load has a tendency to turn in the direction of the arrow $x$, Figure 2. The disk $D^1$ then engages, by means of its studs $d^2$, with the inner sides of the rods G. The latter are then pushed apart, thereby pressing the brake band F hard against the inner wall $c^3$ of the housing $C^1$, so that any lowering of the load on the rope E is impossible as long as no turning moment acts upon the hand lever $k^2$.

When the load has to be raised, the hand lever $k^2$ and with it the pinion K is turned in the direction of arrow $y$ Figure 2. As a consequence, the spur gear J and the disk H, the rope drum A and the shaft D at first remaining stationary, will turn idly in the opposite direction, to arrow $x$, until the studs $h^1$ arrive in the position denoted by I in engagement with the rods G. If the hand lever $k^2$ is turned further in the same direction, the studs $h^1$ exercise an exterior pressure on the rods G, thus overcoming the pressure generated by the moment of load and transmitted by the studs $d^2$ and making the free ends of the brake band F approach each other. In this manner the brake on the one hand will be released and the disks $D^1$ and H, on the other hand, be coupled together, so that the turning, which the hand lever $k^2$ imparts to the disk H by means of the spur gearing K J, is transmitted to the shaft D. As soon as the hand lever $k^2$ is released, a spreading of the rods G will take place, influenced by the pressure generated by the moment of load and transmitted by the studs $d^2$, so that the rope drum A will be held by the brake band F.

In order to lower the load, the hand lever $k^2$ has to be turned in opposite direction to the arrow $y$. The disk H will now turn in the direction of the arrow $x$, and the studs $h^1$ impinge against the rods $G^1$ as indicated by II, so that the rods are again pressed together and consequently the brake released. The brake band F together with the rods G now turns together with the disk H with a speed corresponding to that of the hand lever $k^2$, and in the direction of the arrow $x$. After the releasing of the brake, the disk $D^1$, actuated by the moment of load, commences to rotate and will, in a short while, reach the same speed of rotation as the disk H. Should the speed of rotation of the disk $D^1$ exceed that of the disk H, the studs $h^1$ will then be left behind, releasing the rods G, which are now turning together with the disk $D^1$. The studs $d^2$ will thereupon spread again the rods G, thus causing the braking of the shaft D. This braking, which causes the slowing down of the disk $D^1$, lasts until the studs $h^1$ have again reached the rods G, thereby again releasing the brake. The disk $D^1$ tries then again to run by the disk H, and the described procedure is repeated. As the releasing and applying of the brake band takes place within very short intervals, the load does not move substantially faster than if the disk $D^1$ were continuously coupled together with the disk H. As soon as the hand lever $k^2$ has been released, the braking of the shaft D takes place as already described, and the load is arrested.

If the load, instead of being suspended from the rope E, as was supposed hereabove, is suspended from the rope $E^1$, the operation occurs in a similar manner, as will be evident from the above description, and needs therefore no further explanation. The brake, forming the subject matter of the present invention, is, consequently particularly suitable for hoisting devices with changeable turning direction of the moment of load.

I claim:

1. An automatic brake for hoisting devices, having a hoisting drum and a driving gear, a revoluble member positively connected with said drum and a second revoluble member positively connected with said driving gear, said revoluble members being mounted coaxially, coupling means between said revoluble members, said revoluble member connected to the drum, having projections for engaging said coupling means at a distance from its axis of rotation, said second revoluble member connected to the said driving gear, having projections for engaging the aforesaid coupling means at a greater distance from its axis of rotation than the first mentioned revoluble member, said coupling means having slight angular movement relative to said revoluble members in both directions from its idle position.

2. An automatic brake for hoisting devices, having a hoisting drum and a driving gear, a revoluble member positively connected with said drum and a second revoluble member positively connected with said driving gear, said revoluble members being mounted coaxially, coupling means between said revoluble members; said coupling means comprising a pair of arms fulcrumed one on each side of the axis of the revoluble members, one of said revoluble members having projections for engaging with said arms externally and the other revoluble member having projections for engaging with said arms internally.

3. An automatic brake for hoisting devices, having a hoisting drum and a driving gear, a revoluble member positively connected with said drum and a second revoluble member positively connected with said driving gear, said revoluble members being mounted coaxially, coupling means between said revoluble members; said coupling means comprising a pair of arms fulcrumed one on each side of the axis of the revoluble members, one of said revoluble members having projections for engaging with said arms externally and the other revoluble member having projections for engaging with said arms internally, a slight turning movement of said members relative to said means from their free position being required before said engagement takes place.

4. An automatic brake for hoisting devices, having a hoisting drum and a driving gear, a revoluble member positively connected with said drum and a second revoluble member positively connected with said driving gear, said revoluble members being mounted coaxially, coupling means between said revoluble members; said coupling means comprising a cylindrical housing, a flexible band engaging with the inner cylindrical wall of the housing, a pair of arms connecting the free ends of said band with the opposite side of the band, one of said revoluble members having projections for engaging with said arms externally, and the other revoluble member having projections for engaging with said arms internally.

5. An automatic brake for hoisting devices, having a hoisting drum and a driving gear coaxially mounted therewith, a revoluble member positively connected with said drum and a second revoluble member positively connected with said driving gear, said revoluble members being mounted coaxially, coupling means between said revoluble members; said coupling means comprising a cylindrical housing coaxially situated relative to said drum, a flexible band engaging with the inner cylindrical wall of the housing, a pair of arms connecting the free ends of said band with the opposite side of the band, one of said revoluble members having projections for engaging with said arms externally, and the other revoluble member having projections for engaging with said arms internally, a slight turning movement of said members relative to said means from their free position being required before said engagement takes place.

6. An automatic brake for hoisting devices, having a hoisting drum and a driving gear coaxially mounted therewith, a revoluble member positively connected with said drum and a second revoluble member positively connected with said driving gear, said revoluble members being mounted coaxially, coupling means between said revoluble members; said coupling means comprising a cylindrical housing coaxially situated relative to said drum, a flexible band engaging with the inner cylindrical wall of the housing, a pair of arms connecting the free ends of said band with the opposite side of the band, one of said revoluble members having projections for engaging with said arms externally, and the other revoluble member having projections for engaging with said arms internally, a slight turning movement of said members relative to said means from their free position being required before said engagement takes place, whereby said drum carrying a load will turn said first revoluble members thereby causing its projections to engage with the inner side of said arms thus driving them apart and holding said flexible band tightly against said housing.

7. An automatic brake for hoisting devices, having a hoisting drum and a driving gear coaxially mounted therewith, a revoluble member positively connected with said drum and a second revoluble member positively connected with said driving gear, said revoluble members being mounted coaxially, coupling means between said revoluble members; said coupling means comprising a cylindrical housing coaxially situated relative to said drum, a flexible band engaging with the inner cylindrical wall of the housing, a pair of arms connecting the free ends of said band with the opposite side of the band, one of said revoluble members having projections for engaging with said arms externally, and the other revoluble member having projections for engaging with said arms internally, a slight turning movement of said members relative to said means from their free position being required before said engagement takes place, whereby said driving gear when revolved will turn said second revoluble member causing its projections to engage with the outer side of said arms thus bringing the arms together and releasing the pressure between said band and said housing.

8. In an automatic load-applied brake for elevators having two coaxially mounted members, rotatable relatively to each other within certain limits, and in continuous positive connection, the one with that member on which the load acts, and the other with a suitable driving member; a third body comprising a braking member rotatable about the same axis with the said relatively rotatable members, two rods lying one on each side of the common axis of rotation and secured to said third body, striking pieces located on one of said relatively rotatable members, projecting between the rods and acting to spread them apart, striking pieces located upon the other of said relatively rotatable members, adapted to lie against the rods from without and press them together, the rods having such connection with the braking member that the displacement which can be imparted to them through the striking pieces of that one of the relatively rotatable members which stands in positive connection with the driving member, effects a release of the brake, and the displacement which can be imparted to them through the striking pieces on the other of said relatively rotatable members will effect an application of the brake.

The foregoing specification signed at Barmen, Germany, this 23rd day of December, 1914.

GUSTAV KLEBER. [L. S.]

In presence of—
FRANCES NUFER,
ALBERT NUFER.